United States Patent
Braxton

[15] 3,683,882
[45] Aug. 15, 1972

[54] ELASTIC TYPE DART AND BALL PROJECTING DEVICE

[72] Inventor: Henry R. Braxton, 3753 Hepburn Ave., Los Angeles, Calif. 90018

[22] Filed: Dec. 17, 1970

[21] Appl. No.: 99,148

[52] U.S. Cl. .................124/20 B, 124/22, 124/50, 43/18 R, 124/20 A, 124/20 R, 43/19
[51] Int. Cl. ...........................F41b 7/00, F41b 7/04
[58] Field of Search..........124/20, 22, 21, 35, 41, 49, 124/50, 30 B; 43/18 R

[56] References Cited

UNITED STATES PATENTS

| | | | |
|---|---|---|---|
| 1,188,027 | 6/1916 | Widdop | 124/35 X |
| 2,569,604 | 10/1951 | Hall | 43/19 |
| 2,645,217 | 7/1953 | Fisher | 124/20 R |
| 3,314,186 | 4/1967 | Viveiros | 43/18 R |

Primary Examiner—Richard C. Pinkham
Assistant Examiner—William R. Browne
Attorney—Lyon & Lyon

[57] ABSTRACT

A fishing sling and sporting device having a handle portion, a barrel extending from said handle portion and adapted to receive a fishing reel, a U-shaped sling support fastened in an upright position on top of said hand grip and resilient bands fastened to said support. The U-shaped support and bands function as a sling shot. The barrel has a guide means at its forward end to direct the fishing line from the reel and around the end of the barrel and upward to the resilient band. The device is also equipped with a hingedly mounted arrow guide and dart rest for the shooting of arrows and darts.

8 Claims, 5 Drawing Figures

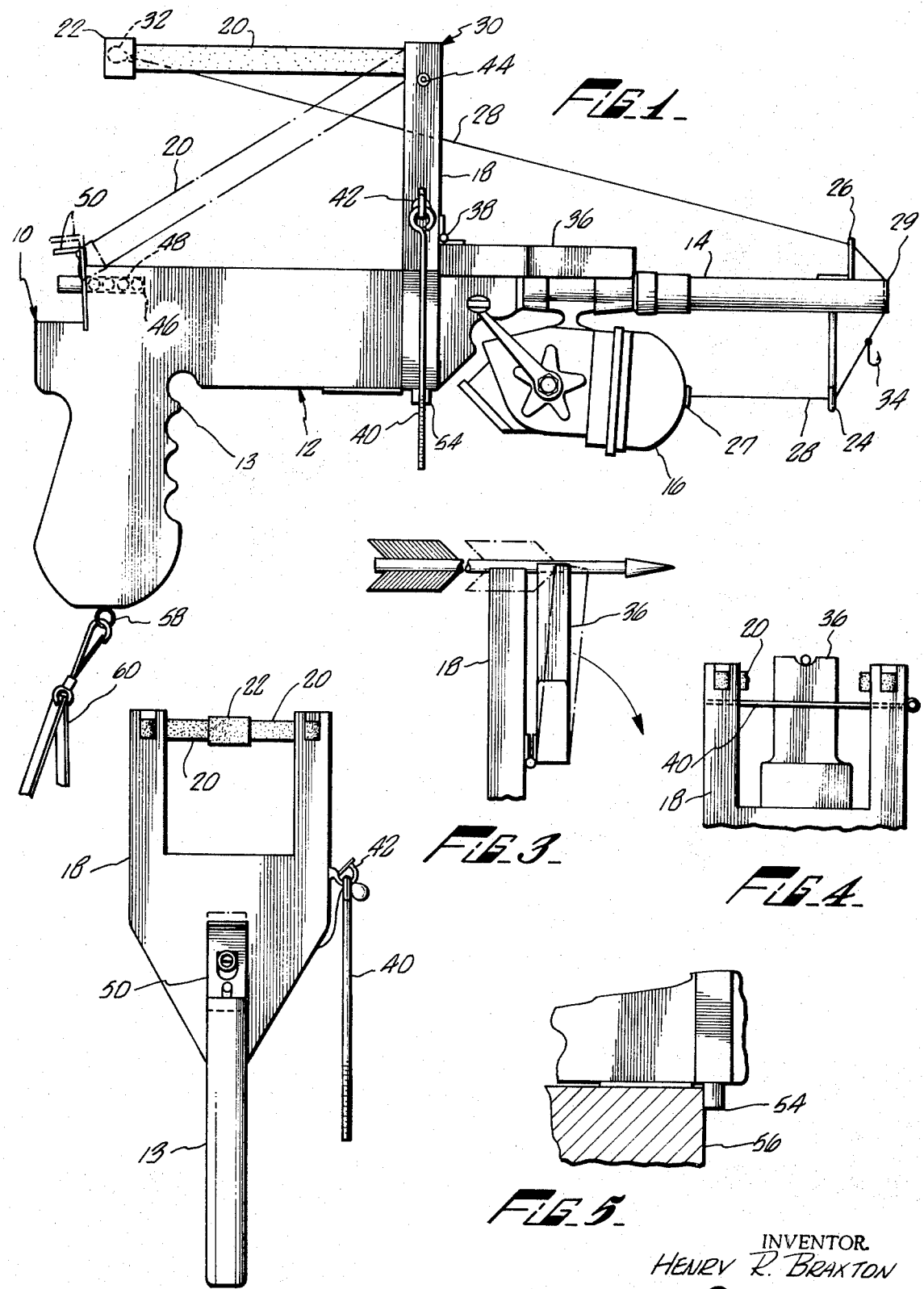

3,683,882

ELASTIC TYPE DART AND BALL PROJECTING DEVICE

This invention relates to a fishing sling and sporting device for use by fishermen in areas where rod and reel casting is either prohibited or practically impossible. It is also capable of shooting arrows and darts for hunting and target practice.

Today there are several fishing areas in which rod and reel casting is either prohibited or practically impossible. This is generally due either to large crowds or to the heavy foliage in the fishing area. A beach pier is a good example of a place wherein casting is prohibited due to the large crowds present at the pier. If casting were permitted, several people would be injured by the sharp fish hooks flying through the air. As a result of such restrictions the fishermen are required to fish straight down from the edge of the pier as one would fish using only a drop line. This tremendously limits the water area about such a pier in which fish may be caught and also greatly restricts the number of people which can fish from such a pier. Another situation in which one is prevented from casting is where the surrounding trees and/or brush are so dense as to make it practically impossible to attempt such a cast without fouling the line. In such areas, the portion of the stream which can be reached by a fisherman is tremendously curtailed.

It is therefore the principal object of this invention to provide a device for the casting of a fishing line which can be used both in crowded areas without danger to the surrounding people and in heavy growth areas without the danger of tangling one's line in the surrounding foliage.

It is another object of this invention to provide a device which is capable of casting a fishing line a great distance with a minimal body movement on the part of the caster.

It is a further object of this invention to provide a fishing line casting device which is adaptable for use in other forms of hunting activity or target use.

It is yet a further object of this invention to provide a fishing line casting device which is of simple construction and economical to manufacture.

These and other objects and advantages of the present invention will become apparent from the following detailed description taken in conjunction with the accompanying drawings.

Briefly the fishing sling and sporting device consists of a sling mounted on a gun-like device comprising a handle and barrel portions. The reel is mounted on the barrel portion and the line is guided from the reel about the end of the barrel to a sling. The line with a weighted sinker may then be shot or slung a great distance into the water. The device is also adaptable for the shooting of arrows, darts and steel balls at game or targets.

In the drawings:

FIG. 1 is a side elevation of the fishing sling and sporting device.

FIG. 2 is a rear elevation of the fishing sling and sporting device.

FIG. 3 is a fragmentary view of the U-shaped support and arrow guide with an arrow passing therethrough.

FIG. 4 is a partial rear view of the U-shaped support and arrow guide, showing the dart guide also in place.

FIG. 5 is a partial sectional view showing a portion of the handle, U-shaped support and stud firing support which is resting on a wall, shown in partial section.

Referring now in detail to the drawings, the fishing sling and sporting device 10 is comprised of a body 12 having a hand grip or handle portion 13 and a barrel 14. The barrel is adapted to hold a fishing reel 16, which is secured to the underside of the barrel, as shown in FIG. 1. A U-shaped support member 18 is positioned atop the handle portion 13 and rearward of the barrel 14. A resilient band 20 is fastened to each of the vertical arms of the U-shaped support 18, with the opposite ends of the bands being secured to a pouch 22, as shown in FIG. 2, whereby the support members 18, bands 20 and pouch 22 function as a sling shot. A first line guide means 24 is positioned on the underside of the forward portion of barrel 14. A second line guide means 26 is positioned atop the forward portion of the barrel, whereby a fishing line 28, which is gathered in spinning reel 16, is guided out of the reel at 27, through a first guide means 24, around the front of the barrel, through a vertical guide channel 29 therein, about a third guide means 26 and back towards the sling, generally designated 30. The end of the fishing line has a weight or sinker 32 fastened thereto. The sinker is placed into the pouch and upon releasing the drag in the spinning reel can be slung from the device 10 by means of the sling shot-like action, carrying the fishing line far over the water. A fish hook or hooks 34 is placed on the line, as shown in FIG. 1, and is carried with the line and sinker into the water.

The device 10 is also equipped with an arrow guide 36 which is secured to the lower portion of the U-shaped support member 18 by pivot means 38. When the guide 36 is in the raised position, as shown in FIG. 3, an arrow can be shot from the device, utilizing the sling for the driving force and the guide for support. As the arrow passes over the guide means 36, the guide rotates forwardly of the support means thereby preventing any damage to the feathers of the arrow as the arrow passes over the guide means. It should be noted that in conjunction with the shooting of arrows, the device can be used for spear fishing. This is accomplished by simply connecting the fishing line 28 from the spinning reel 16 to the arrow to be fired. When the arrow is shot at a fish, the arrow and fish can be retrieved through the use of the line.

The fishing sling and sporting device is also equipped with a dart guide bar 40, which, when not in use, hange from a spring locked hook 42, which is secured to support member 18, as shown in FIGS. 1 and 2. The U-shaped support means 18 has threaded apertures 44 therein which are adapted to receive and hold the dart guide bar 40. With the bar so held, the device is capable of shooting darts in a similar fashion to the manner in which it shoots arrows. Thus the fishing sling and sporting device is capable of firing both arrows and darts at game or targets as well as casting a fishing line into waters previously inaccessable to the fisherman.

The device is also equipped with a passageway 46 at the rearward portion of the handle 12. This passageway is adapted to hold a number of steel balls 48 which can also be fired from this device. A lock 50 is provided at the opening to this passageway to secure the balls within the passageway. The device is also equipped with a band holder 52 for securing the resilient bands 20 when the sling 30 is not in use. A stud 54 is secured beneath the U-shaped support member and is adapted to aid the fisherman in the casting of the line. The caster positions the device so that the stud 54 abuts a wall or rail 56, as shown in FIG. 5. The stud thereby helps to hold the device in place while the bands 20 are being stretched rearward prior to release. A fastening means 58 is positioned beneath the handle portion 12 and a support strap 60 is secured thereto. The support strap is adapted to fit about a portion of the fisherman's body and aid him in fighting a large fish.

Various changes and modifications may be made in carrying out the present invention without departing from the scope and spirit thereof. Insofar as these changes and modifications are within the purview of the appended claims they are to be considered as part of the invention.

What is claimed is:

1. A fishing and supporting device comprising a body portion adapted to support a fishing reel, an upright U-shaped support member mounted approximately midway between the ends of said body portion, at least one resilient band fastened to said support member forming a sling, means secured to said body portion for guiding a fishing line from a reel to said sling for projection therefrom, said body portion comprising a hand grip member and a barrel member, said barrel member extending forwardly from said hand grip and supporting a fishing reel thereunder, said means for guiding a fishing line comprising a first guide means carried by said barrel for guiding a fishing line from the underside of the barrel to the end of the barrel, a fishing line guiding means positioned adjacent the terminal end of the barrel for guiding a fishing line from the first guide means positioned under the barrel across the end of the barrel and over the top of the barrel to an elevated position so as to engage the band at the upper extremity of the U-shaped member.

2. The combination of claim 1 including a support strap carried by said hand grip and adapted to be placed about a portion of a user's body.

3. The combination of claim 2 including a spinning reel secured to the underside of said barrel.

4. The combination of claim 2 further comprising a guiding means pivotally fastened to the lower portion of said U-shaped support member and having a groove in the upper surface thereof for guiding an arrow therethrough so that upon pivoting said pivoted guiding means to a vertical position an arrow may be shot from the device utilizing said pivoted guiding means for giving direction and support to an arrows, said pivoted guiding means being pivotally connected so that said last mentioned means will pivot forwardly of said support member when the feathers of an arrow pass over said last mentioned means, thereby preventing damage to feathers.

5. The combination of claim 4 including a spinning reel secured to the underside of said barrel, whereby upon securing a line from said reel to the arrow to be shot, an arrow can be retrieved subsequent to shooting.

6. The combination of claim 4 including a dart guide bar, a pair of apertures extending through said U-shaped support member, said apertures being adapted to receive said dart guide bar, the axis extending between said apertures being perpendicular to the longitudinal axis of the fishing sling and sporting device, upon insertion of said dart guide bar into said apertures, said dart support bar cooperates with said sling whereby darts may be shot from the device, and a supporting means secured to said U-shaped support member for supporting said dart guide bar when said bar is not in use.

7. The combination of claim 6 including a chamber in said hand grip, said chamber being adapted to hold steel balls of the type which could be fired from the sling, and means for holding said balls within said chamber.

8. The combination of claim 7 wherein a stud is provided on the underside of said hand grip, said stud being adapted to aid in the firing of said fishing sling and sporting device when said device is rested on a support, said stud abutting a support.

* * * * *